Jan. 2, 1968  J. DE FORAS  3,361,389
FLEXIBLE WING AIRCRAFT
Filed Nov. 3, 1965
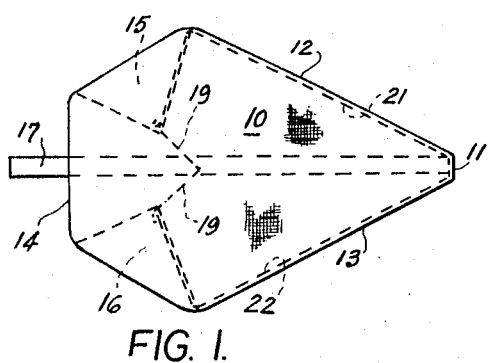
FIG. 1.
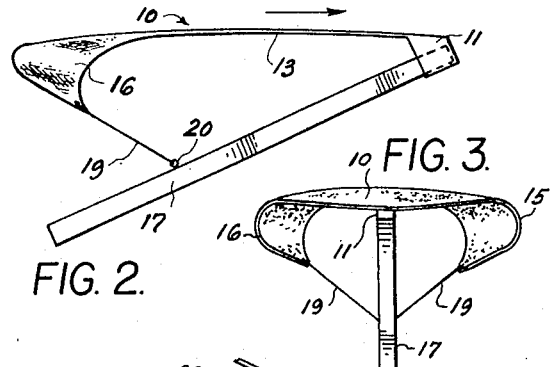
FIG. 2.
FIG. 3.
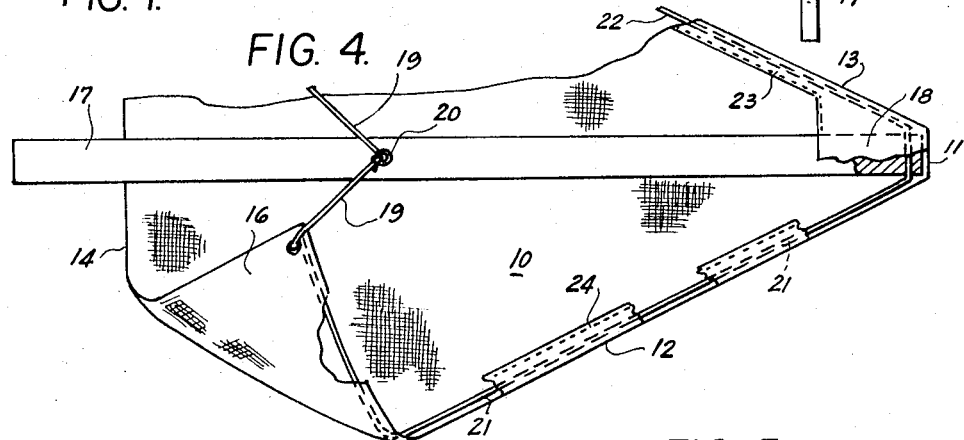
FIG. 4.
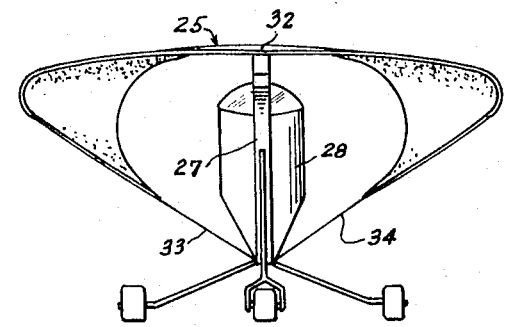
FIG. 6.
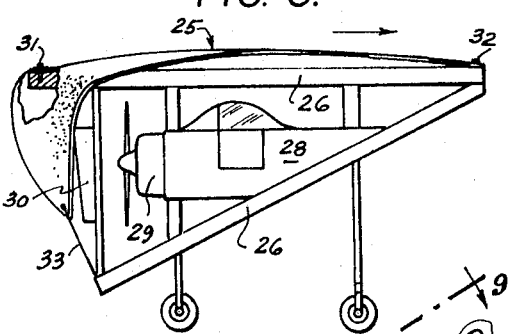
FIG. 5.
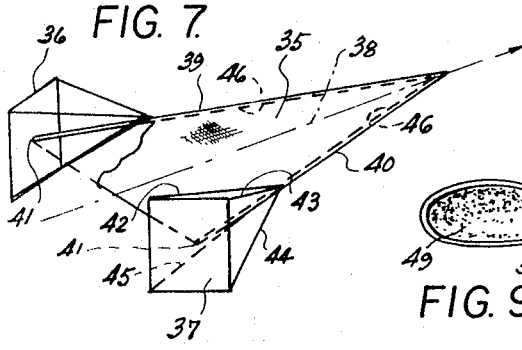
FIG. 7.  FIG. 8.  FIG. 9.
INVENTOR
JOSEPH de FORAS
BY
George F. Des Marais
ATTORNEY 007
United States Patent Office 3,361,389
Patented Jan. 2, 1968

3,361,389
FLEXIBLE WING AIRCRAFT
Joseph de Foras, Chateau de Thuiset, Thonon,
Haute-Savoie, France
Filed Nov. 3, 1965, Ser. No. 506,177
8 Claims. (Cl. 244—49)

ABSTRACT OF THE DISCLOSURE

An aircraft comprising a triangular wing of flexible sheet material and a rigid-body load carrier suspended therebeneath, said load carrier being pivotally connected to the fore corner portion of the wing and also supported from the wing by a pair of cords respectively attached to the opposite rear corner portions of the wing, the other or lower ends of said cords being attached to said load carrier spacially from the wing in a vertical transverse plane located rearward of said pivotal connection. A baffle is arranged on each of the side edges of the wing adjacent its trailing edge to react rearwardly and outwardly on the wing to effect the deployment of the wing from the thrust of air on the air-engaging surfaces of the baffles when the aircraft is airborne. According to one aspect of the invention the baffles are formed entirely by the rear corner portions of the wing, and in other forms of the aircraft air-engaging devices are attached to the wing adjacent to the rear ends of the sides of the wing to effect deployment of wing.

---

The present invention relates to flexible wing aircraft and, more particularly, to aircraft having flexible wings deployable by thrust from the air through which they move.

The primary purpose of the present invention is to provide an aircraft comprising an assemblage of a flexible wing and a load carrier wherein the wing is flexible throughout and is deployed and held in a deployed condition through the agency of the thrust of air upon deflecting surfaces of baffles attached to the leading edges of the wing.

Other objects, features and advantages of the present invention and the preferred ways of practicing it will be evident from the accompanying drawings and the following description of illustrative embodiments of the invention.

In the drawings,

FIG. 1 illustrates an aircraft with a deployed flexible wing, as viewed from above;

FIG. 2 is a side view of the aircraft of FIG. 1;

FIG. 3 is a front elevational view of the aircraft of FIG. 1;

FIG. 4 is an enlarged underside view of the aircraft of FIG. 1;

FIG. 5 is a side view of a flexible wing as applied to a frame for mounting an engine;

FIG. 6 is a front elevational view of the aircraft shown in FIG. 5;

FIG. 7 is a perspective view of a flexible wing with modified forms of baffles;

FIG. 8 illustrates another form of baffle; and

FIG. 9 is a detail as viewed on line 9—9 of FIG. 8.

The wing comprises a flexible sheet or sail 10 which is substantially triangular when laid out flat. It may be made of any textile material, including natural or synthetic fibers, and coated with a plastic material, if desirable to reduce the porosity of the sheet. It may also be reinforced with flexible wires or cords. The wing is essentially a sail which can be produced by employing technics familiar to the art of sail making. In general the wing is relatively light for its size and flexible throughout, irrespective of whether or not flexible wires or cords are used therein to enhance its tensile strength.

The nose 11 is at the intersection of two leading edges 12 and 13 which meet at the fore-end of the wing and diverge rearwardly toward the trailing edge 14 with which they make equal angles at the rear corners 15 and 16 of the wing. The longitudinal central axis of the wing bisects the trailing edge 14 and passes through the fore-end of the wing, dividing the wing into two areas which together have the conformation of an isosceles triangle. The area of the wing and the angle at the fore-end of the wing are variables dependent upon the weight of loading and speed of flight.

The main element of a load carrier is a rigid spar 17 which is attached at its forward end to the nose 11 of the wing. As shown in FIG. 4, the spar is cemented in place in a pocket 18 sewn in the nose of the wing. It may be attached by lashing, stapling or in any other suitable manner. In flight, the spar extends angularly and downwardly with respect to the central area of the wing where it is supported by two ties 19 of equal length, extending respectively from the respective rear corners of the wing to an anchor 20 on the spar located ahead of the trailing edge of the wing.

The pitch of the ties from the corners toward the anchor 20 causes the rear corners of the wing to bend in curves respectively prolonged into the respective ties. Each wing corner is thus held to form a concave baffle which reacts rearwardly and outwardly on the wing from the thrust of air moving rearwardly relative to a forward movement of the wing. Owing to the diagonal disposition of the air-engaging surfaces these reactions deploy the wing laterally from a folded condition and tension its leading and trailing edges.

The leading edges are bordered by flexible wires 21 and 22 secured at their forward ends to the forward end of the spar and respectively secured at their other ends to grommets in the rear corners 15 and 16. The wires are contained in sleeves 23 and 24 running the full length of the leading edges. The wires have the effect of stiffening the leading edges when the aircraft is airborne.

A wing 25 constructed as hereinabove described is shown in FIGS. 5 and 6 as attached to a rigid triangular frame having a girder 26 generally parallel to the central longitudinal axis of the wing, and a spar 27 inclined downwardly from the fore-end of the girder. The frame mounts a fuselage 28 and operating mechanisms, including an engine 29 and a rudder 30. The wing is attached to the girder at locations 31 and 32 which are respectively adjacent the trailing edge of the wing and in the nose of the wing. The frame is otherwise unattached to the wing except by the ties 33 and 34.

A modification of a flexible wing and baffles is shown in FIG. 7. In this form, the wing 35 is substantially flat in flight. Each of the baffles 36 and 37 is disposed substantially perpendicular to the plane of the wing and pitched at an angle to the longitudinal central axis 38 so as to provide the outward thrust desired on the leading edges 39 and 40. Each baffle is secured at its center 41 to the end of a leading edge. It is stabilized at an appropriate angle by four guys 42, 43, 44 and 45 attached to the corners of the baffle and to a wire 46 in the leading edge of the wing with which it is associated.

Another form of baffle is illustrated in FIGS. 8 and 9. The baffle is in the form of a tapered hollow member 47 formed from any suitable flexible sheet material and attached by sewing to the rearward end of a leading edge 48 of a wing. The conformation of the baffle is such as to present an expansive inner surface 49 to develop a considerable outward thrust on the wing and tension in the wire 50 along the leading edge. Its mouth is held open by a stiff oval ring 51. The baffle also has a rear opening 52 for bleeding air through the baffle. A like baffle is similarly mounted to the other leading edge of the wing.

It is to be understood that the foregoing disclosure relates only to preferred embodiments of the invention and that numerous modifications and alterations may be made therein without departing from the spirit and scope of the invention as set forth in the appended claims.

What is claimed is:

1. A foldable wing aircraft comprising a triangular wing of flexible material and a rigid body load carrier combined therewith, said wing having its longitudinal axis bisecting a forward corner thereof and equally spaced from the two rear corners of the wing, said wing having a leading edge extending between its forward corner and one of its rear corners, a second leading edge extending between its forward corner and the other of said rear corners, a trailing edge extending between the rear corners, said load carrier pivotally connected to said forward corner and extending rearwardly and downwardly therefrom beneath said wing, a pair of ties of equal length attached to said load carrier rearwardly from said pivotal connection and at a location thereon in spaced relationship to said wing, one of said pair of ties being attached to one of the rear corners of said wing and the other of said ties being attached to the other of said rear corners, and means for deploying said wing, said deploying means comprising air-deflecting baffles at the trailing ends of said leading edges whereby the rear corners of the wing are thrust outwardly from the longitudinal axis of the wing and the leading edges are tensioned by the force of air on said baffles.

2. A flexible wing aircraft according to claim 1 wherein flexible wires extend along said leading edges.

3. A flexible wing aircraft according to claim 1, said baffles formed by rear corner portions of said wing.

4. A flexible wing aircraft according to claim 1, said baffles comprising deflecting surfaces attached to said leading edges.

5. A flexible wing aircraft according to claim 1, said baffles comprising deflecting surfaces formed as hollow tapering devices attached to said leading edges, each of said devices so disposed as to present an inner surface for receiving said outward thrust from air entering the devices.

6. A flexible wing aircraft according to claim 1, wherein said load carrier is constituted only of a spar suspended by said ties at an angle with respect to said wing.

7. A flexible wing aircraft according to claim 1, wherein said load carrier comprises an air frame structure and an engine.

8. An aircraft comprising a flexible delta wing having a fore-corner and two rear corners, two leading edges converging to form said fore-corner, flexible wires extending along said leading edges, a trailing edge substantially perpendicular to a central axis through said fore-corner, said trailing edge meeting said leading edges to form said rear corners, a spar pivotally connected at its forward end to said fore-corner and extending rearwardly and downwardly therefrom, means suspending said spar angularly relative to said central axis, said means comprising ties of equal length, one of said ties attached to the spar and to one of said rear corners and a second one of said ties attached to said spar and to the other of said rear corners, said ties bending generally triangular areas of said wing forwardly of said trailing edge and downwardly, said bent areas forming baffles responsive to the thrust of air thereagainst to hold said wing deployed.

References Cited
UNITED STATES PATENTS 3,135,483 6/1964 Girard.
3,153,877 10/1964 Effinger.
3,250,500 5/1966 Hall.

MILTON BUCHLER, *Primary Examiner.*

B. BELKIN, *Assistant Examiner.*